United States Patent [19]
Visage

[11] Patent Number: 5,383,003
[45] Date of Patent: Jan. 17, 1995

[54] DEVICE FOR THE REPRODUCTION OF IMAGES ON A PHOTOSENSITIVE FILM FROM A TRANSPARENT ORIGINAL, IN PARTICULAR FROM THE NEGATIVE OF A PHOTOGRAPH OR FROM A SLIDE

[76] Inventor: Albert B. Visage, Saint-Germain-des-Prés, Chateaurenard, France, 45220

[21] Appl. No.: 170,872

[22] Filed: Dec. 21, 1993

[30] Foreign Application Priority Data

Dec. 28, 1992 [FR] France .................. 92 15794

[51] Int. Cl.⁶ ............................. G03B 27/20
[52] U.S. Cl. ................................... 355/93
[58] Field of Search .......... 355/85, 87, 91, 93, 355/94, 99, 122

[56] References Cited

U.S. PATENT DOCUMENTS

| | | | |
|---|---|---|---|
| 2,842,037 | 7/1958 | Gobeille et al. | 95/76 |
| 3,147,683 | 9/1964 | Hulen | 355/91 |
| 4,322,161 | 3/1982 | Mohr | 355/93 |
| 4,536,085 | 8/1985 | Hliboki et al. | 355/93 |
| 4,664,511 | 5/1987 | Carlson et al. | 355/91 |
| 4,711,570 | 12/1987 | Nelen | 355/91 |
| 4,827,316 | 5/1989 | Brown | 355/79 |
| 4,967,230 | 10/1990 | Meacham | 355/91 |
| 5,255,052 | 10/1993 | Ternes et al. | 355/91 |

FOREIGN PATENT DOCUMENTS 1133626 7/1962 Germany .
4012209C1 5/1991 Germany .

OTHER PUBLICATIONS

Patent Abstracts of Japan; vol. 12, No. 363, Sep. 1988, JP 63-115155.

Primary Examiner—Richard A. Wintercorn
Attorney, Agent, or Firm—Nixon & Vanderhye

[57] ABSTRACT

The device according to the invention includes a chassis (3) comprising a working surface (6) designed to support the photosensitive film (1); a frame (11) connected to the chassis by a hinge pin (19) and comprising a central opening (18); a removable plate (20) capable of being immobilized against the lower face (13) of the frame (11) and comprising a window (21) designed to be blocked by an original (2); an annular seal (36) mounted on the chassis (3) about the working surface (6); a chamber delimited by the seal, as well as by the working surface (6) and the removable plate (20) when the frame (11) presses the latter against the chassis; vacuum-creating means for creating a negative pressure in the chamber; and a light source for printing the film through the original.

8 Claims, 2 Drawing Sheets

DEVICE FOR THE REPRODUCTION OF IMAGES ON A PHOTOSENSITIVE FILM FROM A TRANSPARENT ORIGINAL, IN PARTICULAR FROM THE NEGATIVE OF A PHOTOGRAPH OR FROM A SLIDE

The present invention relates to a device for the reproduction of images on a photosensitive film from a transparent original, in particular from the negative of a photograph or from a slide.

Image reproducing devices presently to be found on the market are complex in structure, which makes them difficult and costly to manufacture. In fact, the complexity of these devices chiefly springs from the difficulties confronting constructors as regards ensuring intimate contact between the photosensitive film and the original and avoiding the presence therebetween of air bubbles that are liable to impair the quality of the images obtained.

The present invention aims to remedy more particularly these drawbacks and, to do so, it provides an image reproducing device which is characterized in that it includes a chassis comprising a working surface designed to support the photosensitive film; a frame connected to the chassis by a hinge pin and comprising an upper face, a lower face and a first side adjacent to the hinge pin; a second side parallel to the first side and a central opening; a removable plate which can be immobilized against the lower face of the frame and comprising a window designed to be blocked by an original, this window being located in front of the central opening when the plate is in place on the frame; an annular seal mounted on the chassis in such a way as to face the portion of the removable plate that is outside the central opening, a chamber delimited by the seal, as well as by the working surface of the chassis and by the removable plate bearing the original, when the frame presses the said plate against the chassis; vacuum-creating means for creating a negative pressure in the chamber; and a light source directed towards the central opening in the frame for printing the film through the original.

The reproduction device according to the invention is very simple in structure and it can be constructed at a highly competitive cost price. It is, furthermore, very easy to use.

Preferably, the face of the removable plate that is designed to receive the original comprises, along the periphery of the window, an adhesive strip having permanent adhesive power.

An original can thus be fixed on the periphery of the window of the removable plate easily and securely. It is easy, furthermore, to remove the original, the adhesive permitting this removal by reason of its permanent adhesive power which prevents it from providing a definitive bond.

Advantageously, the frame comprises means for retaining the removable plate against its lower face.

The risks of the removable plate being displaced in relation to the frame or the chassis during use of the reproduction device are thus removed.

According to one particular form of embodiment, the retaining means include a strip parallel and adjacent to the first side of the frame, this strip being movable along at least two rods provided with a protuberance on their free end and fixed onto the lower face of the frame, as well as elastic members surrounding the rods along their portions included between their protuberance and the strip.

These retaining means enable the removable plate to be immobilized quickly in relation to the frame. It suffices, in fact, to insert one of the sides of the plate beneath the strip for the latter, in cooperation with the elastic members, to retain it against the frame.

When the removable plate has sides the length of which is greater than the distance between the rods, it is desirable for it to comprise lateral notches designed to admit the said rods when it is introduced between the strip and the frame.

These notches in fact enable the plate to be introduced further underneath the strip and improve the degree of its retention against the frame.

Preferably, the retaining means also include a channel having a bottom covering the second side of the frame and two wings advancing over the upper and lower faces thereof, this frame being movable along at least two rods provided with a protuberance at their free end and fixed onto the second side of the frame, as well as elastic members surrounding the rods along their portion included between their protuberance and the bottom of the channel.

Thanks to these other retaining means, the plate can be immobilized more securely against the frame, which contributes to further improving the quality of the images obtained.

In order to create a negative pressure in the chamber more easily, it is desirable for the working surface of the chassis to comprise a groove running internally along the seal and into which emerges at least one conduit connected to the vacuum-creating means.

Furthermore, to enable the photosensitive film to be positioned accurately on the working surface when using the reproduction device in a dark room, the chassis advantageously comprises at least two series of pins, disposed perpendicularly in relation to one another, the pins being able to retract under the action of the removable plate, when the latter is pressed against the working surface.

One form of embodiment of the present invention will be described herebelow by way of any example that is in no way limitative and with reference to the annexed drawings wherein.

Figure 1:
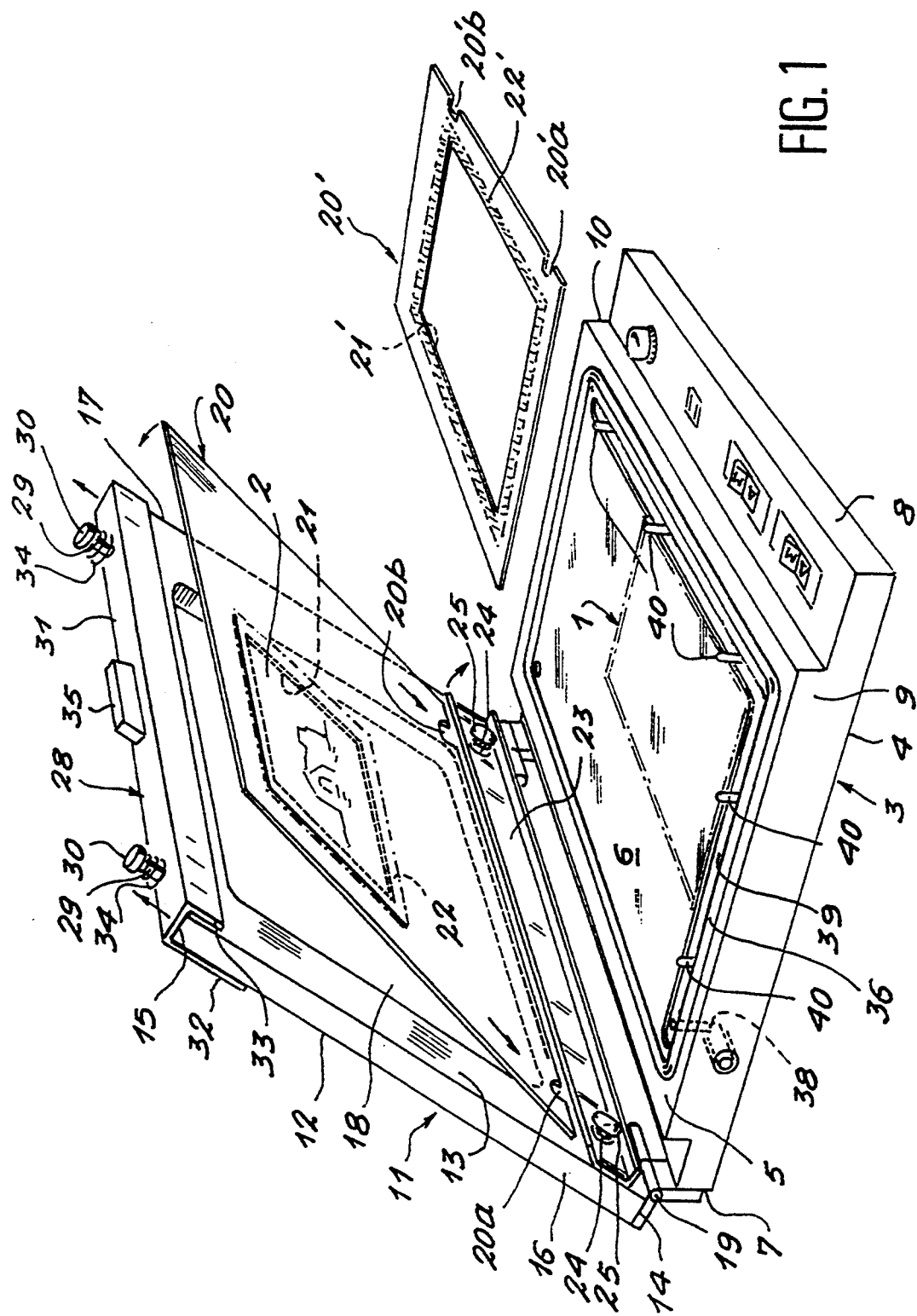
FIG. 1 is schematic perspective view of a reproduction device according to the invention, this device being represented with two different removable plates.

The device shown in the drawings has been developed for reproducing images, by contact, on a photosensitive film 1 from a transparent original 2 such as the negative of a photograph or a slide.

It includes a chassis 3 comprising a lower face 4, an upper face 5 on which is provided a horizontal working surface 6, two longitudinal sides 7, 8 and two transverse sides 9, 10.

Figure 2:
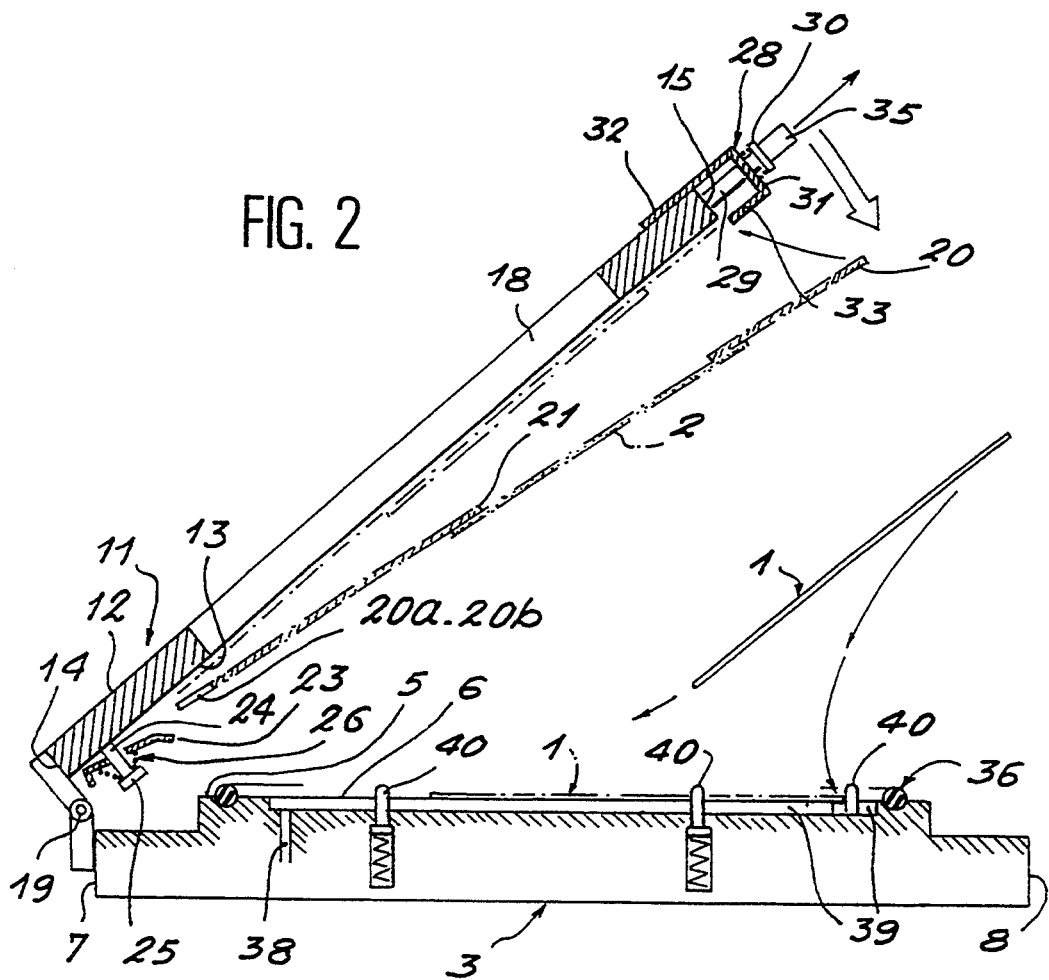
FIG. 2 is a schematic cross-sectional view of the device shown in FIG. 1, the frame being represented in an inclined position in relation to the chassis.
Figure 3:
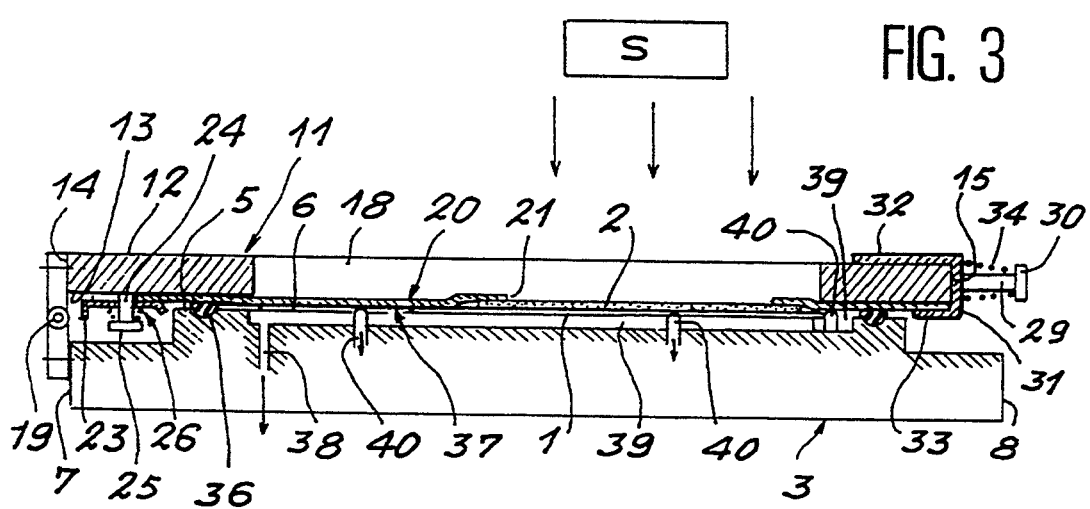
FIG. 3 is a view analagous to that of FIG. 2, but showing the frame in a position parallel to the working surface of the chassis.

It also includes a frame 11 comprising an upper face 12, a lower face 13, two longitudinal sides 14, 15, two transverse sides 16, 17 and a central opening 18. Frame 11 hinges upon chassis 3 about a horizontal hinge 19. The latter is parallel and adjacent to longitudinal side 7 of the chassis as well as to longitudinal side 14 of the frame, so that the latter can pivot between an inclined position, in which its lower face 13 is inclined in relation to working surface 6, as represented in FIG. 2, and a horizontal position, in which its lower face is parallel to working surface 6, as represented in FIG. 3.

The reproduction device further comprises a removable rectangular plate 20, which can be immobilized against lower face 13 of frame 11 and which comprises a window 21 the dimensions of which are slightly smaller than those of the original 2 to be reproduced, window 21 being produced in a location such that it is placed in front of central opening 18 of frame 11 when the plate is in place against the latter.

It will be noted here that the face of plate 20 which is designed to receive original 2 comprises, along the periphery of window 21, an adhesive strip 22 having permanent adhesive power, that is to say the particularity of not providing a definitive bond.

Thanks to adhesive strip 22, original 2 can thus be swiftly fixed in front of window 21 of the plate, or be removed therefrom just as swiftly.

In order to enable plate 20 to be immobilized against lower face 13 of frame 11, the latter comprises a strip 23 movable along two rods 24 provided with a protuberance 25 at their free end and fixed onto lower face 13, strip 23 being parallel and adjacent to longitudinal side 14 of the frame, while two helicoidal springs 26 surround rods 24, between their protuberance 25 and strip 23, and bias the latter against the frame.

As plate 20 has a length greater than the distance between rods 24, its longitudinal side designed to be inserted between strip 23 and lower face 13 of the frame comprises notches, 20a, 20b, designed to admit rods 24.

It will be readily appreciated that notches 20a, 20b enable plate 20 to be inserted over a greater distance beneath strip 23 and better immobilized against lower face 13 of the frame.

With more particular reference to FIGS. 2 and 3, it will be noted that the longitudinal side of strip 23 which faces towards longitudinal side 15 of the frame curves in the direction of chassis 3. This arrangement has, of course, the advantage of facilitating insertion of plate 20 beneath the strip, against the bias of springs 26.

Frame 13 further comprises a channel 28, which is movable along two rods 29 provided with a protuberance 30 at their free end and fixed on longitudinal side 15 of the frame, channel 28 having a bottom 31 covering longitudinal side 15 and two wings 32, 33 advancing over the upper face 12 and lower face 13 of the frame, while two helicoidal springs 34 surround rods 29, between their protuberance 30 and bottom 31 of the channel and bias the latter against longitudinal side 15 of the frame.

As more clearly shown in FIG. 1, channel 28 comprises a gripping member 35 projecting on its bottom and by means of which the user can displace the channel along rods 29, against the bias of the springs, as represented in FIG. 2.

When plate 20 is pressed against lower face 13 of frame 11, its longitudinal side comprising notches 20a, 20b being inserted beneath strip 23, its other longitudinal side extends substantially short of longitudinal side 15 of frame 11.

It thus suffices to apply traction to gripping member 35 of channel 28 to press the other longitudinal side of plate 20 against the frame, and to allow channel 28 to return to its original position in order for its wing 33 to advance over the said other longitudinal side and retain it.

Returning now to chassis 3, it should be noted that it comprises, on its other face 5, a seal 36 surrounding working surface 6. This seal, which is of a rectangular shape, is positioned such that, when plate 20 is immobilized against frame 11, and the latter extends parallel to chassis 3, the part of plate 20 that surrounds opening 18 comes to bear against it, as represented in FIG. 3.

When frame 11 extends parallel to chassis 3, seal 36 delimits, with working surface 6 and removable plate 20 bearing original 2, a chamber 37 connected by a conduit 38 to vacuum source, not represented.

It is thus possible to create a negative pressure in chamber 37 in order to remove any air bubbles that might be present between film 1 and original 2 and affect the quality of the image obtained.

In the example represented, conduit 38 emerges in a groove 39 running internally along two adjacent sides of seal 36, this groove enabling the negative pressure created in chamber 37 to be made uniform swiftly.

Finally, it should be noted that pins 40 are distributed along the two sections of groove 39 and project slightly therefrom. They are disposed along the two sides of working surface 6 which run along the groove and are able to retract under the action of plate 20 when frame 11 extends parallel to the chassis.

These pins have been provided to enable the user to place film 1 on working surface 6 without difficulty when he is working in a dark room.

The position of film 1, as defined by pins 40, corresponds, or course, to the position of window 21 of plate 20 when the latter is in place against lower face 13 of frame 11.

For completeness, it should be noted that the reproduction device according to the invention comprises a light source S, schematically represented in FIG. 3, this source being designed to illuminate central opening 18 in frame 11, in order to print film 2 through original 2.

It is pointed out, for information, that this device must be used in a dark room to ensure that film 1 is not overexposed through the action of daylight or an artificial light.

The reproduction device according to the invention is very easy to use. To reproduce, on a film 1, an image formed on original 2, one can proceed as follows.

First of all, the periphery of original 2 is pressed against adhesive strip 22 provided around window 21 in plate 20. This first operation thus enables original 2 to be fixed onto plate 20 in such a way as to block window 21 of the plate.

Then, the longitudinal side plate 20, bearing notches 20a, 20b, is introduced beneath strip 23, until rods 24 come into abutment against the bottom of the said notches.

Traction is now applied to gripping member 35 of channel 28, as represented in FIG. 2, after which plate 20 is pressed against lower face 13 of the frame, following which gripping member 35 is released to allow wing 33 of channel 28 to cap the other longitudinal side of plate 20. The latter is thus in place against lower face 13 of frame 11, original 2 being located, or course, in front of central opening 18 in the frame.

Film 1 is then place on working surface 6 of the chassis using pins 40 as guide means. Then, frame 11 is pivoted until plate 20 comes to bear against seal 36, and it is locked in this position in a manner known 'per se'.

Chamber 37, which is delimited by seal 36 as well as by plate 20 bearing original 2 and by working surface 6, is now connected to a vacuum source, so as to create a negative pressure in this chamber and thus ensure that there are no air bubbles present between film 1 and original 2.

When the negative pressure created in the chamber is sufficient, film 1 is exposed by illuminating original 2, for a predetermined period, using light source S, through central opening 18 in frame 11.

Chamber 37 is then restored to atmospheric pressure, after which frame 11 is pivoted to disengage working surface 6 of the chassis, after which the exposed film is recovered.

Original 2 can, of course, be kept in order to reproduce the image that it bears on a new film. However, it can also be replaced by an original having the same dimensions.

The device according to the invention can also be used to reproduce image of larger dimensions on films of corresponding dimensions. It suffices, in fact, to replace plate 20 by a plate 20', represented in FIG. 1, which comprises a window 21', an adhesive strip 22' having permanent adhesive power and notches 20'a, 20'b, the distance between which is the same as that for notches 20a, 20b.

For completeness, it will be noted that, in the reproduction device according to the invention, original 2 blocks window 21 of removable plate 20, in the absence of any glass plate. The risks of dust particles and air bubbles accumulating between the original and a glass plate, as in the case of present reproduction devices, are thus completely eliminated, hence preventing the formation of flaws on the reproduction obtained, as well as avoiding lengthy and tedious cleaning operations such as have been necessary hitherto after each handling operation.

I claim:

1. Device for the reproduction of images on a photosensitive film (1) from a transparent original (2), in particular from the negative of a photograph or from a slide, characterized in that it includes a chassis (3) comprising a working surface (6) designed to support the photosensitive film (1); a frame (11) connected to the chassis by a hinge pin (19) and comprising an upper face (12), a lower face (13) and a first side (14) adjacent to the hinge pin (19), a second side (15) parallel to the first side and a central opening (18); a removable plate (20) which can be immobilized against the lower face (13) of the frame (11) and comprising a window (21) designed to be blocked by an original (2), this window being located in front of the central opening (18) when the plate (20) is in place on the frame; an annular seal (36) mounted on the chassis (3) in such a way as to face the portion of the removable plate (20) that is outside the central opening (18), a chamber (37) delimited by the seal (36), as well as by the working surface (6) of the chassis (6) and by the removable plate (20) bearing the original (2), when the frame (11) presses the said plate against the chassis; vacuum-creating means for creating a negative pressure in the chamber (37); and a light source (S) directed towards the central opening (18) in the frame for printing the film (1) through the original (2).

2. Device according to claim 1, characterized in that the face of the removable plate (20) which is designed to receive the original (2) comprises, along the periphery of the window (21), an adhesive strip (22) having permanent adhesive power.

3. Device according to claim 1, characterized in that the frame (11) comprises means for retaining the removable plate (20) against its lower face (13).

4. Device according to claim 3, characterized in that the retaining means comprise a strip (23) parallel and adjacent to the first side (14) of the frame (11), this strip being movable along at least two rods (24) provided with a protuberance (25) at their free end and fixed onto the lower face (13) of the frame, as well as elastic members (26) surrounding the rods (24) along their portion included between their protuberance (25) and the strip (23).

5. Device according to claim 4, characterized in that the removable plate (20) comprises lateral notches (20a, 20b) designed to admit the rods (24) when it is introduced between the strip (23) and the frame (11).

6. Device according to claim 5, characterized in that the retaining means also include a channel (28) having a bottom (31) covering the second side (15) of the frame (11), and two wings (32, 33) advancing over the upper (12) and lower (13) faces of the frame, this channel being movable along at least two rods (29) provided with a protuberance (30) at their free end and fixed to the second side (15) of the frame, as well as elastic members (34) surrounding the rods (29) along their portion included between their protuberance (30) and the bottom (31) of the channel (28).

7. Device according to claim 1, characterized in that the working surface (6) of the chassis (3) comprises a groove (39) running internally along the seal (36) and into which emerges at least one conduit (38) connected to the vacuum-creating means.

8. Device according to claim 1, characterized in that the chassis (3) comprises at least two series of pins (40) disposed perpendicularly in relation to one another, these pins being able to retract under the action of the removable plate (20) when the latter is pressed against the working surface (6).

* * * * *